UNITED STATES PATENT OFFICE 2,206,168

PROCESS FOR MANUFACTURING FATTY ESTERS

August Edeler, Cincinnati, and Albert S. Richardson, Wyoming, Ohio, assignors to The Procter & Gamble Company, Cincinnati, Ohio, a corporation of Ohio No Drawing. Application August 22, 1932,
Serial No. 629,886

18 Claims.  (Cl. 260—411)

Our invention relates to the manufacture of fatty esters containing combined polyhydric alcohol in amount sufficient to have a substantial proportion of the alcoholic hydroxyl groups unesterified. Our invention is especially adapted for the conversion of triglyceride fatty esters (which constitute the major part of most natural fats) to monoglyceride and diglyceride, and is applicable also to the reaction of other polyhydric alcohols with fatty esters, including those which contain alcohols other than glycerin in combination with fatty acids, such as sperm oil and spermaceti. The following equations illustrate the reaction involved in our process:

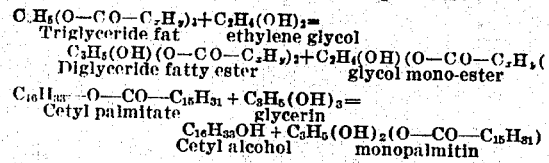

It is already known that glycerin reacts slowly with fats (consisting predominantly of triglycerides) at temperatures well above 200° C., with formation of diglyceride and probably some monoglyceride. Various powdered solids, e. g., kieselguhr or fuller's earth, have been proposed as catalysts for this reaction, but these substances at best affect a slight increase in reaction rate, temperatures above 200° C. still being required for the reaction. For convenience and economy, and for safeguarding the quality of monoglyceride and diglyceride, more rapid reaction rates and lower reaction temperatures are desirable. This is particularly true where a product high in monoglyceride is wanted.

Reactions of this type may be accelerated by using in the reaction mixture a small quantity of a metal salt of a carboxylic acid, such as ordinary soap, or of an alcoholate, such as sodium glyceroxide, or of various alkaline or potentially alkaline materials such as sodium carbonate or potassium hydroxide, which are capable of reacting with fatty esters to form soap. Practical use of these materials, which are herein referred to collectively as alkaline catalysts, is disclosed in our copending application, Serial No. 629,885 filed August 22, 1932.

The object of the present invention is to provide an improved process for carrying out the reaction between polyhydric alcohols and fatty esters, especially at temperatures near 150° C. and lower, in the presence of alkaline catalysts. The present invention does not claim the process of using an alkaline catalyst as such.

We have found that the efficiency of alkaline catalysts in accelerating the combination of polyhydric alcohols with fatty esters is greatly increased if the process is carried out in such a manner as to distill water out of the reacting system, i. e., remove the water as vapor during the reaction. Aside from any water originally present in glycerin or any of the other reactants which may be used, we have found that, during reaction of polyhydric alcohols with fatty esters in presence of soap or other alkaline catalyst, water is formed in small but appreciable amount as a result of side reactions not fully understood. We have further found that this water has a retarding influence upon the catalyzed reaction, and at about 150° C. or lower is likely to stop the reaction considerably short of completion.

Our invention thus consists in carrying out the reaction of polyhydric alcohols with fatty esters in the presence of an alkaline catalyst with suitable provision for distilling water from the reacting mixture.

A specific procedure is to pass a gas through the reacting mixture. This gas serves as a means of agitation and also sweeps out of the system the moisture which is continuously formed throughout the reaction. The outlet gas should not be allowed to cool at any point which would make possible refluxing of water back into the reaction mixture.

If mechanical agitation is used, the gas may be passed through or over the reacting mixture. Because of the limited solubility of polyhydric alcohols in fatty esters, some form of agitation is required.

The gas used in our process must be substantially inert toward the alkaline catalyst, and preferably should be inert toward all ingredients in the reaction mixture. Thus air may be used, but preferably we use nitrogen or hydrogen.

Also our invention may be practiced by carrying out the reaction under a vacuum to effect distillation of water from the reacting system, with either mechanical or gaseous agitation to effect the necessary mixing.

Our invention is particularly valuable because it makes practical the controlled combination of glycerin with fats at moderate temperatures, e. g., 90° C. to 150° C. It is useful generally for increasing the speed of this and similar reactions both in this low temperature range and also at higher temperatures, especially up to about 175° C. Although advantages may be realized at temperatures up to about 205° C., as the temperature is increased the advantage is lessened, both because the control of distillation of the polyhydric alcohol along with the water becomes increasingly difficult and because at these higher temperatures the reaction tends to proceed very smoothly even without any special precautions to sweep out the moisture.

For making products such as monoglyceride, containing a maximum of combined polyhydric alcohol, we use as catalyst preferably 1% to 5% sodium soap based on the total fatty ester, or an equivalent amount of caustic alkali, but higher amounts of the catalyst give even faster reaction, and some advantage can be realized by use of even less than 1% soap or equivalent alkali. When the polyhydric alcohol to be combined with fatty ester is less than the maximum, the amount of catalyst used may be decreased in about the same proportion.

*Example 1.*—Nitrogen gas was passed for two hours through a mixture of 30 parts coconut oil, 13 parts C. P. glycerin, and 0.6 part dried commercial soap flakes, heated to 175° C. After settling and removal of the excess glycerin, the upper fatty layer had a saponification value of 186.5 (uncorrected for dissolved glycerin and soap), indicating approximately complete conversion to monoglyceride.

*Example 2.*—169 parts completely hydrogenated cottonseed oil, 13.6 parts ethylene glycol, and 1.7 parts dried commercial soap flakes were mechanically agitated at 150° C. and nitrogen passed steadily over the top of the mixture. After two hours the saponification value of the fat had fallen to 182, indicating approximately complete reaction with the quantity of glycol used.

*Example 3.*—100 parts cottonseed oil, 72 parts C. P. glycerin, and 5 parts sodium acetate were mechanically agitated at 175° C. and nitrogen passed steadily over the top of the mixture. The course of the reaction was followed by withdrawing samples and observing the saponification value of the fatty layer which separated from the excess of glycerin. Somewhat more than four hours was required for approximately complete conversion to monoglyceride.

*Example 4.*—100 parts completely hydrogenated cottonseed oil, 22.4 parts pure glycerin, and 5 parts dried commercial soap flakes were mechanically agitated at 150° C. in a vacuum vessel, the pressure being maintained at about 1½ inches of mercury. The time required for complete reaction, as judged by homogeneous appearance of the reaction mixture, was sixty-seven minutes.

In Examples 1, 2, and 4, sodium or potassium ethoxide or other alcoholate, or caustic alkali, equivalent in amount to the soap used, can be used as catalyst with about the same result as stated. Efficient reaction, although somewhat slower, can also be obtained by use of equivalent amounts of alkaline salts such as sodium carbonate or bicarbonate.

The quantity of glycerin chemically combined with fatty esters in our process may be varied within wide limits. By limiting the quantity of glycerin used, we may obtain from an ordinary fat a reaction mixture containing principally triglyceride but having a slight excess of combined glycerin over that contained in the original fat, mainly in the form of diglyceride. Our process is likewise suited for combining with fatty esters approximately the full amount of glycerin required to form the monoglyceride of all the fatty acid contained in the original fatty ester used, for instance, in the case of ordinary fat of about 195 saponification value a maximum of about 21 parts pure glycerin for each 100 parts of original fat. Between these two extremes we can obtain reaction mixtures comprising triglyceride, diglyceride and monoglyceride in varying proportion and containing any desired excess of combined glycerin over that present in ordinary triglycerides.

In a similar manner, the proportion of polyhydric alcohol other than glycerin to be combined with fatty esters in our process may be varied from traces up to a maximum of approximately one mol of polyhydric alcohol per mol of total fatty acid present in the reaction mixture.

Among other uses, the reaction products of our process may serve as emulsifying agents when added to mixtures of water with fatty or mineral oils, for instance, for the production of cosmetics.

Having thus described our invention, what we claim as new and desire to secure by Letters Patent are:

1. The process of chemically combining glycerin with fatty esters of the type found in fats and fatty oils which comprises agitating same together in the presence of a catalytically active compound selected from the group consisting of alcoholates and soaps at a temperature between 90° C. and 175° C. and removing water vapor from the reacting mixture.

2. The process of forming fatty esters of the class consisting of monoglycerides and diglycerides which comprises heating to a temperature not substantially less than 90° C. and not substantially greater than 175° C. in a stream of inert gas a mixture of triglyceride fat, glycerin, and a catalyst of the class consisting of alcoholates of alkali metals and soaps of alkali metals, the said gas being inert with respect to the reaction mixture.

3. The process of forming fatty esters of the class consisting of monoglycerides and diglycerides which comprises mixing and heating to a temperature not substantially less than 90° C. and not substantially greater than 175° C. under a vacuum a triglyceride fat, glycerin and a sodium soap formed by partial saponification of said fat.

4. In the process of manufacturing esters of the class consisting of monoglycerides and diglycerides by chemical reaction at a temperature not substantially less than 90° C. and not substantially greater than 175° C. of triglyceride fats with glycerin in the presence of a catalyst of the class consisting of soaps and alcoholates, the step which comprises distilling from the reacting mixture water formed by side-reactions therein.

5. The process of chemically combining polyhydric alcohols with fatty esters which comprises agitating same together at a temperature not substantially less than 90° C. and not substantially greater than 175° C. in the presence of a catalytically active compound selected from the group consisting of alcoholates and soaps at a temperature not less than 90° C. and concurrently removing water vapor from the reacting mixture.

6. The process of manufacturing fatty glycerides containing combined glycerin in excess of that occurring in ordinary triglycerides which comprises agitating a mixture of fat, glycerin, and a compound selected from the group consisting of alcoholates of alkali metals and soaps of alkali metals under vacuum, and heating the mixture sufficiently to effect reaction of glycerin with the triglyceride of the fat, the temperature being not substantially less than 90° C. and not substantially greater than 175° C.

7. In the process of manufacturing esters of the class consisting of monoglycerides and diglycerides by chemical reaction of triglyceride fats with glycerin at a temperature not substantially less than 90° C. and not substantially greater than 175° C. in the presence of a catalyst of the class consisting of soaps of alkali metals and alcoholates of alkali metals, the step which comprises distilling from the reacting mixture water formed by side-reactions therein.

8. The process of chemically combining polyhydric alcohols with fatty esters which comprises agitating same together in the presence of a catalytically active compound comprising an alcoholate of an alkali metal at a temperature not substantially less than 90° C. nor substantially greater than 175° C., and concurrently removing water vapor from the reacting mixture.

9. The process of manufacturing fatty glycerides containing more combined glycerin than required for triglyceride formation which comprises chemically combining glycerin with a fatty ester of the type found in fats and fatty oils, heating and agitating same together, to a temperature not substantially less than 90° C. and less than the boiling point of glycerin at the pressure under which the reaction is carried out, with a catalytically active compound selected from the group consisting of alcoholates and soaps, and removing water vapor from the reacting mixture.

10. The process of chemically combining glycerin with fatty esters of the type found in fats and fatty oils, which comprises heating and agitating same together, at a temperature not substantially less than 90° C. and less than the boiling point of glycerin at the pressure at which the reaction is carried out, in the presence of soap formed by partial saponification of said fatty esters, and removing water vapor from the reacting mixture.

11. The process of manufacturing fatty glycerides containing combined glycerin in excess of that occurring in ordinary triglycerides which comprises agitating a mixture of fat, glycerin, and soap of an alkali metal under vacuum, and heating the mixture sufficiently to effect reaction of glycerin with the triglycerides of the fat, the temperature established being not substantially less than 90° C. and less than the boiling point of glycerin at the pressure at which the reaction is carried out.

12. The process of manufacturing fatty glycerides containing more combined glycerin than required for triglyceride formation which comprises chemically combining glycerin with a fatty ester of the type found in fats and fatty oils by heating and by agitating same together at a temperature not substantially less than 90° C. and not substantially greater than 175° C. with a catalytically active compound selected from the group consisting of alcoholates and soaps and removing water vapor from the reacting mixture.

13. The process of manufacturing fatty glycerides containing more combined glycerin than required for triglyceride formation which comprises chemically combining glycerin with a fatty ester of the type found in fats and fatty oils at a temperature between 90° C. and 205° C. by agitating same together with a catalytically active compound selected from the group consisting of alcoholates and soaps and removing water vapor from the reacting mixture in a stream of gas substantially inert with respect to the catalyst employed.

14. The process of manufacturing fatty glycerides containing more combined glycerin than required for triglyceride formation which comprises chemically combining glycerin with a fatty ester of the type found in fats and fatty oils at a temperature between 90° C. and 205° C. by agitating same together with a catalytically active compound selected from the group consisting of alcoholates and soaps under vacuum.

15. The process of chemically combining glycerin with fatty esters of the type found in fats and fatty oils which comprises heating and agitating same together at a temperature not substantially less than 90° C. and not substantially greater than 175° C. in the presence of soap formed by partial saponification of said fatty esters and removing water vapor from the reacting mixture.

16. The process of chemically combining glycerin with fatty esters of the type found in fats and fatty oils which comprises heating and agitating same together at a temperature not substantially less than 90° C. and not substantially greater than 175° C. with a sufficient quantity of sodium hydroxide to saponify 1% to 5% of said fatty esters and removing water vapor from the reacting mixture.

17. The process of increasing the glycerin content of fat which comprises heating and agitating the molten fat with glycerin at a temperature not substantially less than 90° C. and not substantially greater than 175° C. in the presence of a catalytically active compound selected from the group consisting of alcoholates and soaps and removing water vapor from the reacting mixture.

18. The process of manufacturing fatty glycerides containing combined glycerin in excess of that occurring in ordinary triglycerides which comprises agitating a mixture of fat, glycerin, and soap of an alkali metal under vacuum, and heating the mixture to a temperature not substantially less than 90° C. and not substantially greater than 175° C.

AUGUST EDELER.
ALBERT S. RICHARDSON.